United States Patent [19]

Latham

[11] Patent Number: 4,523,546
[45] Date of Patent: Jun. 18, 1985

[54] SQUIRREL-PROOF BIRD FEEDER

[75] Inventor: Peter A. Latham, Rye, N.H.

[73] Assignee: Opus, Inc., Framingham, Mass.

[21] Appl. No.: 455,605

[22] Filed: Jan. 4, 1983

[51] Int. Cl.³ .............................................. A01K 39/01
[52] U.S. Cl. ................................................ 119/51 R
[58] Field of Search ...................... 119/51 R, 52 R, 63; 47/23, 24

[56] References Cited

U.S. PATENT DOCUMENTS

| | | | |
|---|---|---|---|
| 1,108,764 | 8/1914 | Kull | 47/24 |
| 2,891,508 | 1/1958 | Bower | 119/51 R |
| 3,105,463 | 10/1963 | Pilch | 119/53 |
| 4,026,244 | 5/1977 | Salick | 119/51 R |
| 4,102,308 | 7/1978 | Kilham | 119/51 R |
| 4,188,913 | 2/1980 | Earl et al. | 119/51 R |
| 4,207,839 | 6/1980 | Barry | 119/51 R |
| 4,303,040 | 12/1981 | Mann | 119/62 |

Primary Examiner—Robert P. Swiatek
Assistant Examiner—Kris R. Schulze
Attorney, Agent, or Firm—Wolf, Greenfield & Sacks

[57] ABSTRACT

A device for squirrel-proofing bird feeders includes a flexible covering sheet mounted above or to the upper end of the bird feeder. The sheet is dimensioned and located with respect to the feeder so that when a squirrel attempts to walk on the sheet, the sheet will flex and bend downwardly under the influence of the squirrel's weight. The squirrel will slide off the sheet and with no means or opportunity to grab onto any portion of the sheet or the feeder which it covers.

10 Claims, 3 Drawing Figures

SQUIRREL-PROOF BIRD FEEDER

BACKGROUND AND SUMMARY OF THE INVENTION

This invention relates to bird feeders and, particularly, to a means for squirrel-proofing bird feeders. Interference with bird feeders by squirrels has long been a nuisance to those who desire to maintain and service bird feeders. Squirrels display remarkable agility and ingenuity in getting to the bird feed in bird feeders. This, of course, disrupts the objective of attracting and feeding the birds and tends to discourage birds from feeding at the particular location. Additionally the expense of repeatedly refilling the bird feeders can be significant, particularly when the entire contents of a feeder has been emptied by the squirrel. The desirability for a squirrel-proof bird feeder has long been recognized. Numerous squirrel-proofing devices have been proposed and a number of squirrel-proof devices have been made available commercially. None, however, has proved to be entirely effective. It is among the primary objects of the present invention to provide a squirrel-proofing device for a bird feeder.

In brief, my invention utilizes a flexible sheet of material, such as plastic, which is mounted above or at the upper end of the bird feeder, preferably horizontally. The size of the flexible sheet is such that a squirrel attempting to crawl down along the support wire for the bird feeder cannot reach around the sheet but must place his weight on the flexible sheet. The flexibility of the sheet is such that when the squirrel places his weight onto it, the sheet will bend and flex to form a smooth chute-like surface which causes the squirrel to slide and fall off the sheet. The surface and edge of the sheet is smooth and provides no means by which the squirrel can grab onto the device. The diameter of the device is large enough so that once the squirrel is sliding off and is at the edge of the device he will be too far away from any other portion of the feeder to grab onto it and he will fall to the ground.

It is among the general objects of the invention to provide a squirrel-proofing device for a bird feeder.

Another object of the invention is to provide a squirrel-proof device for a bird feeder which may be used with existing bird feeders or which may be incorporated integrally with a bird feeder system.

Another object of the invention is to provide a squirrel-proofing device for a bird feeder which includes a horizontal flexible sheet member adapted to be located above the bird feeder and being arranged to bend under the influence of the squirrel's weight and in a manner which causes the squirrel to slide off the sheet.

A further object of the invention is to provide a device of the type described which is of simple and inexpensive construction and requires no maintenance.

DESCRIPTION OF THE DRAWINGS

The foregoing and other objects of the invention will be appreciated more fully from the following further description thereof, with reference to the accompanying drawings, wherein:

FIG. 3 is a side elevation of another embodiment of the invention.

DESCRIPTION OF THE ILLUSTRATIVE EMBODIMENTS

Figure 1:
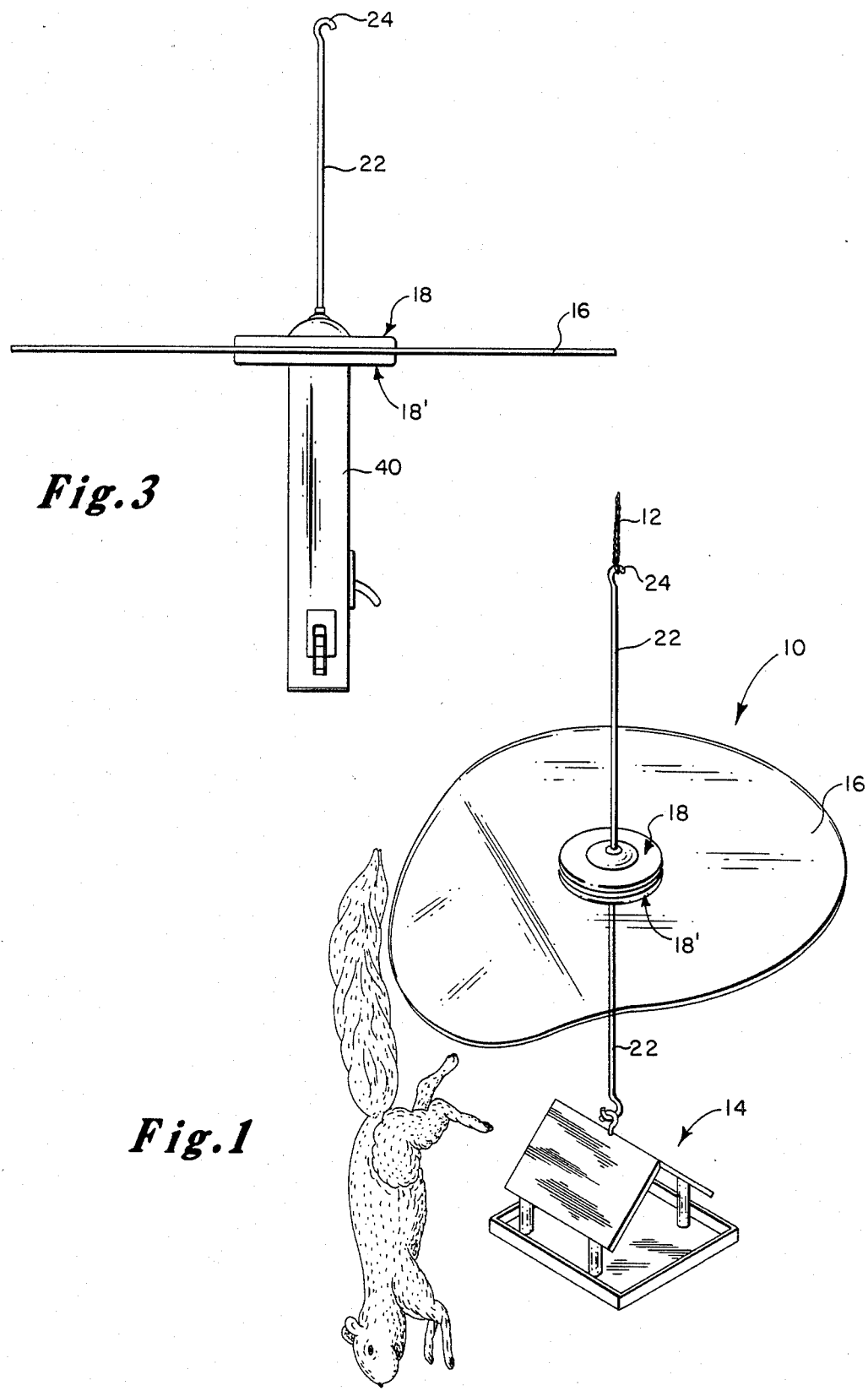
FIG. 1 is an illustration of one embodiment of the device.
Figure 2:
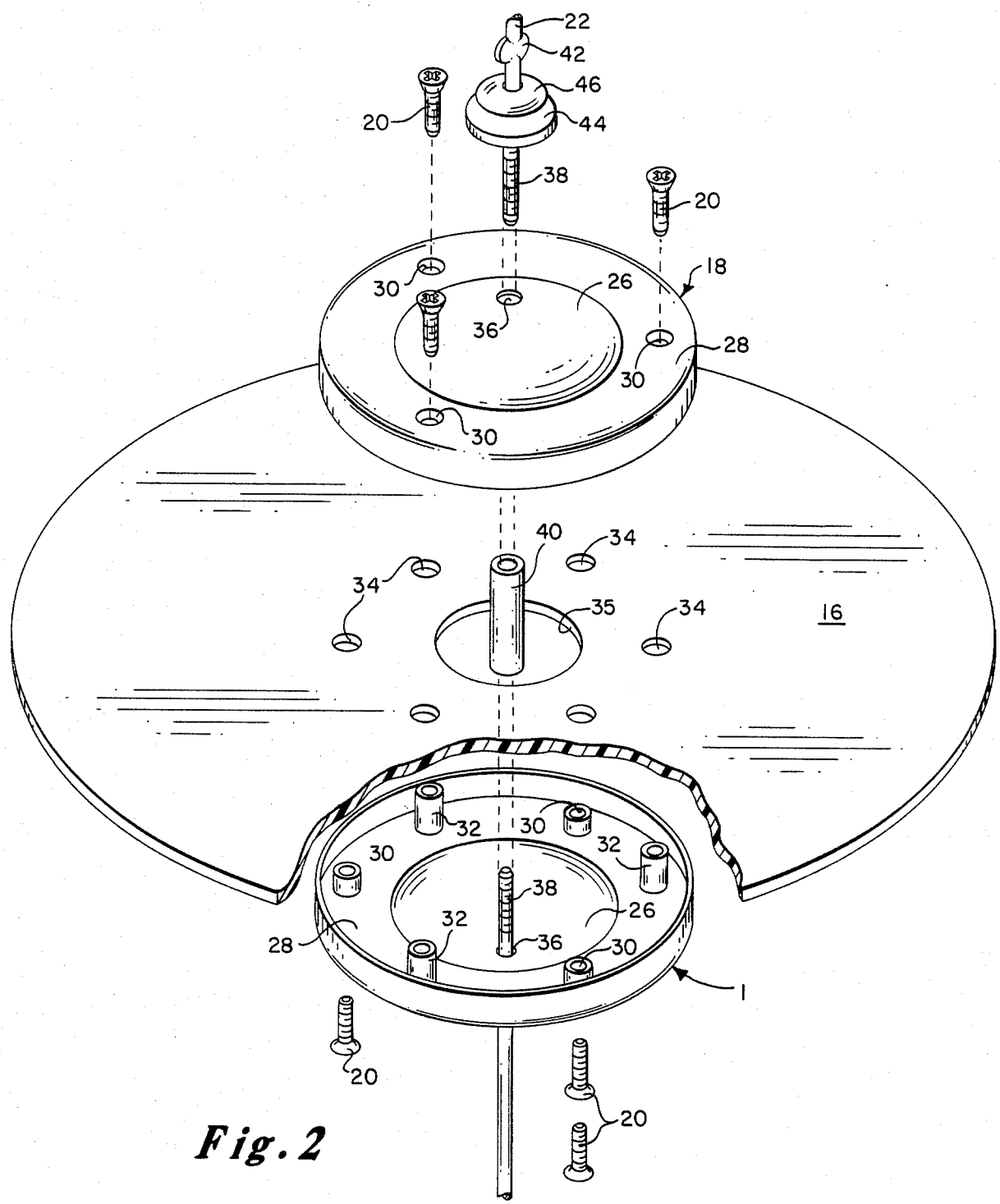
FIG. 2 is an exploded illustration of the device shown in FIG. 1.

FIGS. 1 and 2 illustrate an embodiment of the invention which may be used with any bird feeder. As shown, the device, indicated generally by the reference character 10, is suspended from the bottom of the bird feeder hanging line 12 and the bird feeder 14, in turn, is suspended from the device 10. In this embodiment of the invention the device 10 includes a flexible sheet of material 16 which preferably, although not necessarily, is circular. The sheet 16 may be formed from plastic and, by way of example only, may be about eighteen inches in diameter and about 0.030 inches thick. Such a sheet has been found to provide a proper degree of flexibility, size and smoothness suitable for use in the practice of the invention although it should be understand that those specifications are intended for illustration only and other suitable materials, properly dimensioned, may be substituted.

In the embodiment shown in FIGS. 1 and 2 the sheet 16 is held in place by a pair of caps 18, there being a cap 18 on each side of the sheet. The caps 18 are secured together by fasteners 20 which secure the sheet 16 in a sandwiched configuration between the caps 18. A pair of hanging rods 22 may be provided with hooks 24 on their outermost ends. Means are provided for securing the other ends of the rods 22 to the caps 18, as described below.

The caps, 18, as shown in further detail in FIG. 2, may be molded from plastic. In this illustrative embodiment of the invention, each of the caps 18 may be provided with a central dome portion 26 and a surrounding collar portion 28. A plurality of circumferentially spaced holes 30 may be provided in the collar portion 28 in alternating sequence with a like number of circumferentially spaced bosses 32. The spacing and configuration of the bosses 32 and holes 30 are such that two identically formed caps 18 may be brought together so that the holes 30 in one of the caps will align with the bosses 32 in the other of the caps 18. The bosses 32 serve as a firm anchor for the fasteners 20. The flexible sheet 16 also is provided with a plurality of circumferentially spaced holes 34 through which the fasteners pass and a central hole 35.

In the illustrative embodiment of the invention each of the hanging rods 22 passes through a hole 36 formed centrally in the cap 18 so that an end of the rod can be received within the combined caps 18. The inner ends of the rods 22 are secured together, for example, by forming the inner rods with threads 38 and providing a tubular spacer 40 into which the inner ends of the rods 22 may be screwed. Each of the rods 22 may be provided with an enlarged portion 42 which limits the extent to which the inner end of the rod 22 can extend through the hole 36. A washer 44 and O-ring 46 may be included in the assembly as shown in FIG. 2.

The device is used simply by hanging one of the rods 22, by its hook 24 from the hanging line 12 and then hanging the bird feeder 14 from the hook 24 of the lower hanging rod 22. Preferably the squirrel-proof feeder is hung from a tree far enough from the trunk so that the squirrel cannot jump directly from the trunk to the bird feeder 14 and also so that the bird feeder is high enough from the ground (e.g., five feet) so that the squirrel cannot jump up to the bird feeder. In general the device should be hung in place so that the only access to the bird feeder 14 requires the squirrel to come down along the hanging line 12 onto the flexible sheet 16. As suggested in FIG. 1, when the squirrel places his weight on the sheet the sheet will bend and the squirrel will slide off the sheet. To that end, it is important that the sheet be smooth and provide no means by which the squirrel might grab onto the sheet so as to afford the squirrel an opportunity to reach down and gain a foothold on any portion of the system below the flexible sheet. In this regard, squirrels display remarkable agility and it is among the primary objects of the invention to provide a system which prevents a squirrel from having an opportunity to reach beneath or grap onto anything beneath the flexible sheet. The sheet should be large enough so that its peripheral edge will, at all times, be spaced sufficiently far from any portion of the bird feeder or any part of the system below the sheet so that when the squirrel slides off of the sheet he will be unable to grab or fall down closely along any portion of the suspended devices below. Thus, it is also among the objectives of this invention to provide a device in which the squirrel falling from the device will fall at a location far enough from the device so that he cannot reach it during his fall.

Also among the features of the invention is that when in use the sheet is maintained substantially horizontal except for that portion of the sheet which bends and flexes under the influence of the squirrel's weight. In the embodiment of the invention described thus far, this is achieved by providing a relatively rigid clamping of the central region of the sheet between the caps 18 and by providing a suitable length for the hanging rods 22. This is in contrast to prior devices such as that shown in U.S. Pat. No. 4,026,244 which utilizes a rigid disk simply attached to the hanging line.

An additional feature of the invention is that the weight of the squirrel does not affect the vertical attitude of the bird feeder. In some prior devices using disc-like baffles, the baffles were rigid and the squirrel had an opportunity to vigorously rock the bird feeder so as to shake the bird seed out of the feeder. The squirrel, of course, then could simply drop down to the ground and feed on the fallen bird feed. As will be appreciated from the foregoing description of the present invention, the squirrel is prevented from shaking out any food in that manner with the present device because of the flexibility of the sheet.

The annular region of the sheet 16 which projects radially outwardly from between the caps 18, preferably in at least six to eight inches in radial width. Additionally it is preferred that the lowermost portion of the feeder does not extend below the sheet 16 a distance greater than the diameter of the sheet 16.

FIG. 3 illustrates an alternate embodiment of the invention in which the squirrel-proofing sheet is formed integrally with, or is otherwise rigidly attached to a bird feeder at the upper end of the bird feeder. In this embodiment the squirrel feeder may, for example only, be in the form of an elongated tubular member 48 which is attached to and depends from the lower of the caps 18'. In this embodiment, the threaded lower end of the rod 22 may be screwed directly into a receptive socket formed integrally with the lower cap 18'.

Thus, I have described my improved squirrel-proofing system for a bird feeder which defeats the ingenuity of squirrels both by preventing them from obtaining direct access to the bird feeder as well as by preventing them from shaking loose bird seed from the bird feeder. It should be understood, however, that the foregoing description of the invention is intended merely to be illustrative thereof and that other embodiments and modifications of the invention may be apparent to those skilled in the art without departing from its spirit.

Having thus described the invention what I desire to claim and secure by Letters Patent is:

1. A predator-resistant bird feeder comprising:
  a bird feeder having at least one feeder station;
  a substantially horizontal flexible sheet free of any grippable portions and substantially larger in horizontal plan than the feeder so as to extend laterally beyond the feeder,
  means for supporting the flexible sheet above the feeder station of the feeder for providing an overhead shield for the feeder;
  said flexible sheet being constructed so as to be flexible under the influence of the weight of a predator applied to the sheet whereby the sheet will flex downwardly and define a downwardly extending surface for causing the predator to slide off the sheet and fall beyond the feeder.

2. A device as defined in claim 1 wherein the means for supporting the flexible sheet comprises:
  a pair of caps including an upper cap and a lower cap, the caps being adapted to receive the central region of the sheet therebetween;
  means for securing the caps together to sandwich the central portion of the sheet between the caps, the sheet and caps being constructed so that the major proportion of the sheet extends radially outwardly of the caps and circumferentially about the caps, the radially extending portion of the sheet being free to flex under the weight of the predator.

3. A device as defined in claim 2 further comprising:
  means for suspending the upper cap from an overhead support; and
  means for suspending a bird feeder from the lower cap.

4. A device as defined in claim 3 wherein the caps are identical and the means for suspending the device and the feeder comprise relatively rigid upper and lower rods secured to the caps.

5. A device as defined in claim 4 further comprising:
  each of the caps having a central dome portion and a peripheral collar region, each dome having an opening in the center of the dome region to receive the end of a suspending rod;
  and means for connecting the upper and lower suspending rods at their inner ends within the dome.

6. A device as defined in claim 2 wherein the periphery of the sheet is substantially circular.

7. A device as defined in claim 2 wherein the flexible peripheral portion of the sheet radially beyond the caps defines an anulus of at least six inches radial dimension.

8. A device as defined in claim 7 further comprising said sheet having a diameter of approximately 18 inches and being approximately 0.030 inches thickness.

9. A device as defined in claim 1 wherein the flexible sheet is secured directly to the upper end of the feeder.

10. A device as defined in claim 9 wherein the lowermost portion of the feeder does not extend below the flexible sheet by an amount greater than the maximum width of the sheet.

* * * * *